June 2, 1964     J. ULDERUP ETAL     3,135,539
CLOSURE MEANS
Filed Nov. 14, 1960
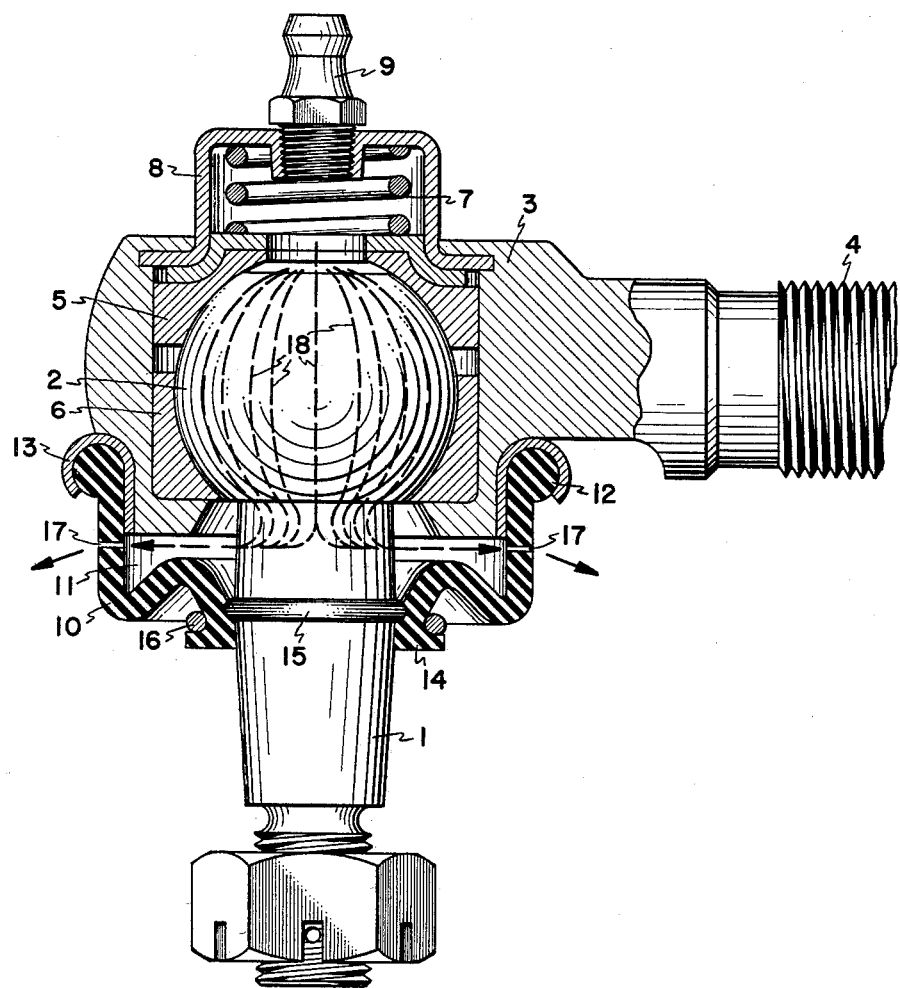

United States Patent Office 3,135,539
Patented June 2, 1964

3,135,539
CLOSURE MEANS
Jurgen Ulderup and Franz Gottfried Reuter,
Lemforde, Hannover, Germany
Filed Nov. 14, 1960, Ser. No. 69,100
Claims priority, application Germany Dec. 23, 1959
1 Claim. (Cl. 287—87)

This invention relates to closure means for universal joints. More particularly the present invention is concerned with a novel closure means for ball and socket joints of the type used in the steering linkages of vehicle wheels, said closure means being formed of an elastic material having capillary apertures adapted to discharge lubricant when widened by internal pressure. The present invention also relates to ball and socket joints comprising these new closure means.

It is common practice to use in automotive steering assemblies ball and socket joints comprising an outer housing, a socket chamber surrounded by said housing, and a ball stud having the ball end thereof disposed in said socket chamber so as to be in tiltable and rotatable relation to said housing.

In such universal joints the socket chamber contains a bushing encompassed by the housing, said bushing enveloping the ball end of the stud. The inner face of the bushing forming the seat of the ball member is complemental to the contour of the ball while the external shape of the bushing is substantially complemental to the contour of the inner face of the housing.

The bushing may be composed of a suitable metal alloy or of a plastic material. While metallic bushings frequently consist of two annular pieces, plastic bushings may be made up of one piece of material.

The service life of universal joints of this type depends upon the extent to which penetration of dirt and dust between the bearing surfaces of the ball and its seat can be prevented. It is therefore common practice to equip such joints with closure means such as a dust cap riding on top of the housing so as to seal the opening of the housing against ingress of foreign matter. In the case of metallic bushings or ball seats it is also common practice to lubricate the joint in order to maintain its mobility and to cut down wear and tear.

In order to prolong the periods between servicing of universal joints used in the steering linkages of vehicle wheels, such as automotive steering assemblies, various expedients are employed. Thus, in the case of plastic bushings, a friction-reducing agent may be incorporated therein. If the ball seats are made of metal a supply of lubricant large enough to last over long periods may be placed in the joint. However, it has always been difficult if not impossible to entirely replace the old lubricant used for a certain time with new lubricant when greasing universal joints of conventional construction since this necessitates pressing all of the used lubricant in the direction of the closure means and ensuring a complete removal of the used lubricant through the opening of the housing.

It is an object of the present invention to provide a novel closure means for the space between the housing and the ball stud of a ball and socket joint, said closure means permitting a complete removal of the used lubricant.

Another object of the present invention is to provide a ball and socket joint which can be lubricated in a simple and efficient manner.

Further objects will appear from the following description with reference to the accompanying drawing, which is a sectional view of a preferred ball and socket joint having a closure means made in accordance with and embodying this invention.

According to the present invention, generally speaking, the foregoing objects and others are accomplished by providing a closure means in the form of an elastic seal having capillary apertures adapted to discharge lubricant when widened by internal pressure.

A preferred seal according to this invention is composed of a highly elastic material comprising an upper portion closely fitted over the housing of the joint, a lower portion closely fitted over the stud of the joint, and a central portion forming an annular space adapted to hold the desired supply of the lubricant, said central portion having capillary apertures adapted to discharge lubricant when widened by internal pressure.

The seals of the present invention are advantageously used in ball and socket joints having a grease nipple on the side of the housing opposite the opening provided for the stud. Such an arrangement has the advantage that the old lubricant contained in the joint can be replaced completely with fresh lubricant by pressing the latter through the nipple with the aid of a grease gun or a similar device. The fresh lubricant thus entering the joint under high pressure (generally exceeding 30 atms.) penetrates into the space between the bearing surfaces and passes from there to the annular supply space displacing the old lubricant from said spaces and driving it through the capillary apertures of the annular supply space opened by the internal pressure. After the joint has been filled with fresh lubricant the internal pressure drops and as a result the capillary apertures in the wall of the seal close completely.

Ball and socket joints containing the novel seals are fully protected against the ingress of dirt and moisture, causing premature wear and corrosion. When used in automotive steering linkages, the joints of the present invention require servicing by lubrication only after extended driving in the order of several thousand miles, the servicing being very simple due to the particular construction of the joints.

The seals of the present invention are made of an elastic material having high tensile strength and tear resistance. In general, it is advisable to use an elastic material whose tear continuance resistance (resistance to tear propagation) is at least 20 kg./cm. Particularly suitable materials are butyl rubber and polyurethane rubber since they combine high tear resistance with excellent chemical resistance, i.e. resistance to aging and lubricants.

An important feature of the present invention resides in the particular manner in which the seal is attached to the joint. In view of the high pressures used in the lubrication of such joints the seal must be firmly connected with the joint. The invention contemplates fastening the seal to the housing by means of a metal band whose upper edge is bent over so as to firmly grip the reinforced rim portion of the seal. The other end of the seal is secured around the stud with a steel ring.

Referring now to the drawing, the stud 1 has the ball end 2 surrounded by the housing 3 which is part of the stem 4. The ball end 2 is disposed in the socket chamber containing the upper ball seat 5 and the lower ball seat 6, which may be made of metal or of a suitable plastic. The coil spring 7 is held under compression between the closure plate 8 and the upper ball seat 5. The closure plate 8 is provided with the grease nipple 9. The seal 10, consisting of an elastic material, forms the annular space 11 receiving the lubricant. The seal has the reinforced upper rim 12 fastened to the lower portion of the housing 3 by means of the metal band 13 whose upper portion is bent outwardly and back upon itself so as to firmly grip rim 12. The lower rim 14 of the seal 10 is pulled over the collar 15 of the stud 1 where it is held in place by the steel ring 16. In the area of the annular space 11 the seal 10 has the capillary apertures 17 which are completely closed under normal conditions of operation and which open to discharge lubricant only when widened by the high pressure applied to the lubrication process. The lubrication of the joint, which is necessary only after extended use, involves applying a grease gun to the nipple 9 whereby fresh lubricant is pressed over the bearing surface of the ball 2 into the annular space 11 as indicated by the broken lines 18. On its way the fresh lubricant displaces the old lubricant, which is forced through the capillary apertures 17 widened by the internal pressure. After the lubrication process and restoration of normal conditions of operation (due to the pressure drop) the capillary apertures 17 close completely so that the seal 10 becomes absolutely tight.

While the invention has been described with reference to the particular construction shown herein, it will be apparent to those skilled in the art that various changes and modifications may be made therein without departing from the spirit and the scope of the invention.

What is claimed is:

A ball and socket joint which comprises a housing provided with a grease nipple and an opening opposite said grease nipple, a socket chamber within said housing, a ball stud having its ball end disposed in said socket chamber, said stud protruding through said opening, and a seal made of an elastic material closing said opening, said seal comprising an upper portion closely fitted over the housing of the joint, a lower portion closely fitted over the stud of the joint, and a central portion forming an annular space adapted to hold the desired supply of the lubricant, said central portion being formed of polyurethane material having high tensile strength and a tear continuance resistance of at least 20 kg./cm. and having self-closing capillary apertures adapted to discharge lubricant when widened by internal pressure within said space obtained by forcing fresh lubricant under high pressure of at least 30 atmospheres into said space, said apertures completely closing themselves after the cessation of flow of fresh lubricant into said space and remaining completely closed under normal conditions of operation.

References Cited in the file of this patent
UNITED STATES PATENTS

| | | |
|---|---|---|
| 2,211,817 | Hufferd et al. | Aug. 20, 1940 |
| 2,304,732 | Flumerfelt | Dec. 8, 1942 |
| 2,397,464 | Booth | Apr. 2, 1946 |
| 2,559,857 | Edwards | July 10, 1951 |
| 3,027,182 | Reuter | Mar. 27, 1962 |